(No Model.)
D. C. CREGIER.
WATER SUPPLY FOR CITIES.
No. 291,158. Patented Jan. 1, 1884.
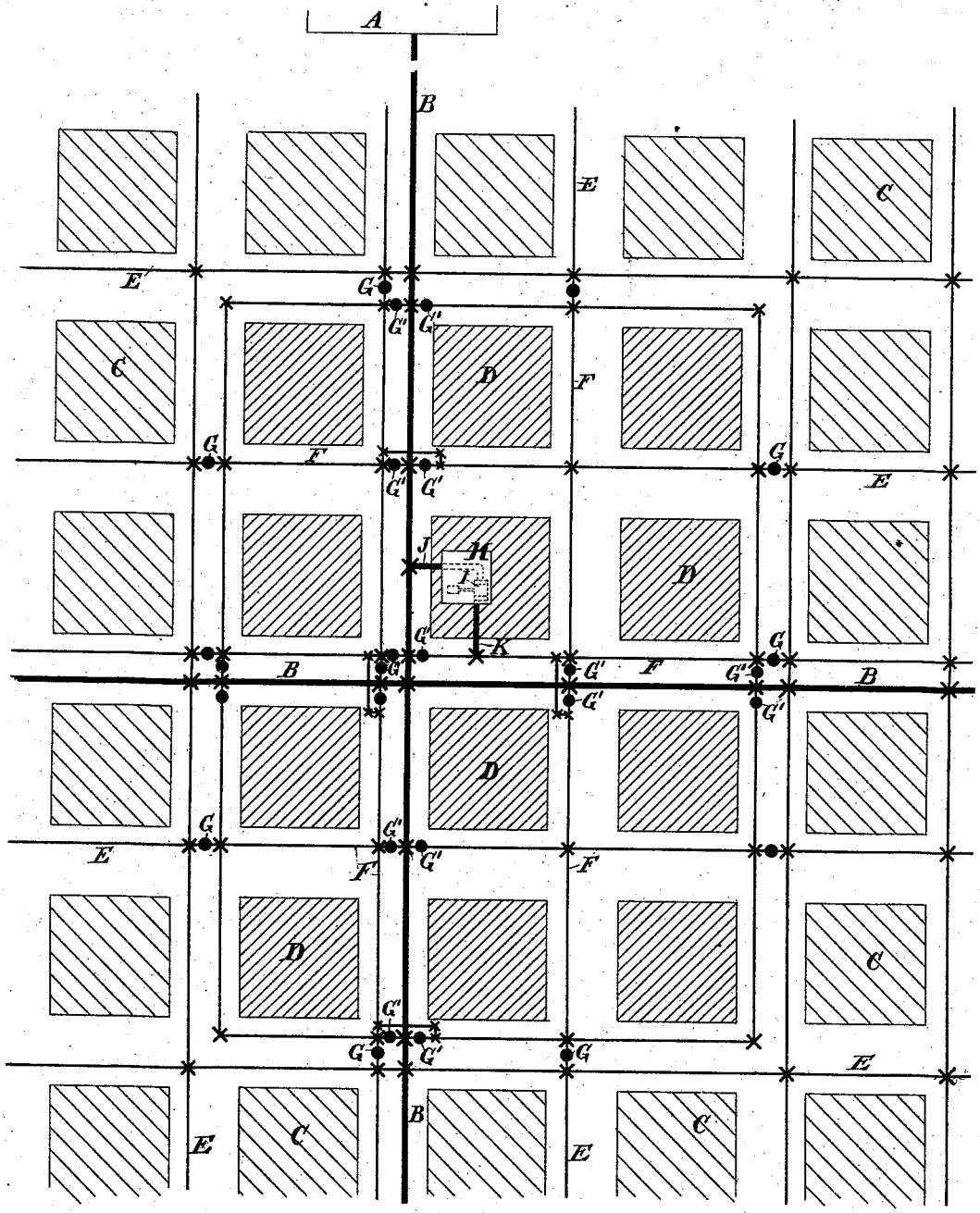
Witnesses:
H. A. Johnstone.
Charles R. Searle.
Inventor:
DeWitt C. Cregier,
by his attorneys
Thomas D. Stetson

UNITED STATES PATENT OFFICE.

DEWITT C. CREGIER, OF CHICAGO, ILLINOIS.

WATER-SUPPLY FOR CITIES.

SPECIFICATION forming part of Letters Patent No. 291,158, dated January 1, 1884.

Application filed April 15, 1882. (No model.)

*To all whom it may concern:*

Be it known that I, DEWITT C. CREGIER, of Chicago, Cook county, in the State of Illinois, have invented certain new and useful Improvements relating to Water-Supply for Cities, of which the following is a specification.

According to this invention I employ a system of pipes, mains, and distributing-pipes, arranged substantially in the ordinary manner, and subdivide the same, by means of valves, into two or more districts. In one or more of these districts the water may be supplied through the mains at the ordinary pressure, which I will hereinafter term "low pressure," while in the other districts the water is supplied at a higher pressure by means of auxiliary pumping-engines. Different pressures may be maintained in the different districts. For instance, when the water in the low-pressure districts may have a natural head of only, say, fifteen or twenty pounds per square inch, the pressure in one high-pressure or high-service district may be maintained at, say, forty pounds per square inch, in another at sixty pounds, and so on, according to the requirements of every district. This subdivision of the general system of pipes, by simply inserting valves at the proper places, enables me to discontinue the high service in any one or more of the high-pressure districts, whenever required, without entirely cutting off the supply from such district.

In the following I will describe the invention as carried out in a city or town which is supposed to have previously had a complete system of water-supply pipes with the same pressure throughout, and in which only one high-service district is created. The accompanying diagram, illustrating a plan of this, forms a part of this specification. In this diagram, A represents a reservoir or stand-pipe, to which the water, at the ordinary pressure, is supplied from a sufficiently high natural source, or by pumping, or by any other ordinary or suitable means, and from which it flows through mains B, to be distributed in the various parts of the city or town.

C represents the ordinary low-service region. D is the high-service district, which in this case is entirely surrounded by the low-service region. One or more of the mains B may run directly through the high-service district, as illustrated in the diagram. This, however, is not absolutely necessary; it suffices that one main at least shall run in reasonably close proximity to said district.

E F are distributing-pipes, which extend both over the low-service and the high service districts in a manner exactly similar to the ordinary arrangement of distributing-pipes, and forming, practically, a complete system of piping; but on the boundaries of the high-service district the pipes E F are provided with valves G, as shown, separating the parts E from the parts F, so that when all the valves G are closed the pipes F form an independent system from the pipes E. At all the points marked $x$, where two pipes meet or intersect, there is a connection made between such pipes. Between the distributing-pipes F and the mains B in the high-service district valves G' are introduced, as shown. It will now be seen that in the low-service district all the pipes E are connected with each other, and also with the mains B, while in the high-service district, when all the valves G and G' are closed, the distributing-pipes F are merely connected with each other, but not with the main B.

H is a pumping-station in the high-service district, the pump or pumps I of which take water from the main B, through the suction-pipe J, and deliver it into the pipes F through the delivery-pipe K. Under ordinary conditions, the valves G and G' are all closed and the low-service water flows from the mains B in the low-service district directly into the distributing-pipes E, while in the high-pressure district a portion of the water flowing through the mains B is taken through the pipe J and by the pump I forced under a higher pressure through the pipe K into the system of distributing-pipes F. A sufficiently elevated reservoir, or its equivalent, may be employed at the pumping-station H in order to secure uniformity of pressure in the pipes F. When a fire occurs in any part of the low-service region, or when for any other reason it is desired to increase the supply of water there, two different modes of working may be adopted, according to the requirements of the case. When only a moderate increase of the supply of water in the low-pressure region is needed, a number of the valves G are opened and the pumping at the station H is stopped. It is preferable to open the valves G which lie on the side opposite to that where the increased supply is needed. Under these circumstances, the high service in the district D being destroyed, a more liberal quantity of low-service water will flow through the mains B into the low-service district beyond, and at the same time the water will not be entirely cut off from the district D, the pipes F being supplied with low-pressure water from the distributing-pipes E through the open valves G. If, however, it shall be found that this supply is inadequate for the high-service district, one or more of the valves G' may be opened in addition, so that the pipes F receive a direct supply from the mains B.

The second mode of operation consists in opening the valves or cocks G on the side of the high-service district nearest to the fire; but in this instance the pumping is continued with less steam-pressure. The effect of this is that the pumps I will work properly against the slight resistance due to the friction of the water in the pipes, thus causing the water to move very actively through the distributing-pipes E and F in the direction toward the fire.

In a city like Chicago, where the land is level, and where one or more districts, full of high buildings, with great demands for water and for power, may require high service, it is always liable to occur that the district lying beyond is very inadequately supplied with water for an emergency like a great fire. It is a small inconvenience for the people living in the high-service district to work under low-service conditions for a few hours per year, while the aid to the district beyond, by sacrificing the high-service isolation for such period, and still more by using the high-service pumping-engines for the aid of the district beyond, by hastening the water to the same, may be incalculable.

Modifications may be made without departing from the principles of the invention. In cases where an entirely new system of pipes is to be laid, the valves G' may be dispensed with, the pipes F being in such case not connected with the mains B, and receiving water, when the pressure in the high and low service districts is to be equalized, only from the pipes E through the valves G.

I claim as my invention—

In a water-supply system, the distributing-pipes E F, having valves G between them, in combination with the mains B, opening directly into the pipes E, and with a pump, I, as intermediate connection between the mains B and pipes F, substantially as herein specified, and for the purposes set forth.

In testimony whereof I have hereunto set my hand, at Chicago, Illinois, this 4th day of March, 1882, in the presence of two subscribing witnesses.

DEWITT C. CREGIER.

Witnesses:
SYLVANUS W. FULLER,
T. E. BELTON.